United States Patent
Knuffman et al.

(10) Patent No.: US 12,223,670 B2
(45) Date of Patent: *Feb. 11, 2025

(54) USING DEEP LEARNING AND STRUCTURE-FROM-MOTION TECHNIQUES TO GENERATE 3D POINT CLOUDS FROM 2D DATA

(71) Applicant: STATE FARM MUTUAL AUTOMOBILE INSURANCE COMPANY, Bloomington, IL (US)

(72) Inventors: Ryan Knuffman, Danvers, IL (US); Jeremy Carnahan, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/355,336

(22) Filed: Jul. 19, 2023

(65) Prior Publication Data

US 2023/0360244 A1    Nov. 9, 2023

Related U.S. Application Data

(63) Continuation of application No. 17/031,643, filed on Sep. 24, 2020, now Pat. No. 11,748,901.
(Continued)

(51) Int. Cl.
*G06T 7/579* (2017.01)
*G06T 15/20* (2011.01)

(52) U.S. Cl.
CPC ............ *G06T 7/579* (2017.01); *G06T 15/205* (2013.01); *G06T 2207/10032* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS 10,311,302 B2   6/2019  Kottenstette et al.
10,366,288 B1   7/2019  Kottenstette et al.
(Continued)

OTHER PUBLICATIONS

Structure from Motion (SfM), GSP 216 Introduction to Remote Sensing class, Humbold State University, Humboldt State Geospatial Online, accessed from the Internet at: <<http://gsp.humboldt.edu/OLM/Courses/GSP_216_Online/lesson8-2/SfM.html> (2017).

*Primary Examiner* — Yanna Wu
(74) *Attorney, Agent, or Firm* — MARSHALL, GERSTEIN & BORUN LLP

(57) ABSTRACT

A server includes a processor and a memory storing instructions that, when executed by the processor, cause the server to receive two-dimensional (2D) images, analyze the images using a trained deep network to generate points, process the labeled points to identify tie points, and combine the 2D dimensional images into a three-dimensional (3D) point cloud using structure-from-motion. A method for generating a semantically-segmented 3D point cloud from 2D data includes receiving 2D images, analyzing the images using a trained deep network to generate labeled points, processing the points to identify tie points, and combining the 2D images into a 3D point cloud using structure-from-motion. A non-transitory computer readable storage medium stores executable instructions that, when executed by a processor, cause a computer to receive 2D images, analyze the images using a trained deep network to generate labeled points, process the points to identify and combine tie points using structure-from-motion.

20 Claims, 9 Drawing Sheets

Related U.S. Application Data

(60) Provisional application No. 62/972,987, filed on Feb. 11, 2020.

(56) References Cited

U.S. PATENT DOCUMENTS

| | | |
|---|---|---|
| 10,643,072 B2 | 5/2020 | Kottenstette et al. |
| 11,151,378 B2 | 10/2021 | Kottenstette et al. |
| 11,210,552 B2 | 12/2021 | Kossyk et al. |
| 11,222,426 B2 | 1/2022 | Richter et al. |
| 11,232,150 B2 | 1/2022 | Vianello et al. |
| 11,367,265 B2 | 6/2022 | Vianello et al. |
| 2020/0134379 A1 | 4/2020 | Gaidon et al. |
| 2020/0134833 A1* | 4/2020 | Biswas ................. G06N 5/046 |
| 2020/0367853 A1 | 11/2020 | Yoo |
| 2021/0056307 A1 | 2/2021 | Li et al. |
| 2021/0065452 A1 | 3/2021 | Gazioglu |
| 2021/0201571 A1* | 7/2021 | State ....................... G06T 7/564 |

\* cited by examiner

USING DEEP LEARNING AND STRUCTURE-FROM-MOTION TECHNIQUES TO GENERATE 3D POINT CLOUDS FROM 2D DATA

CROSS-REFERENCE TO RELATED APPLICATIONS

This application is a continuation of and claims the benefit of U.S. patent application Ser. No. 17/031,643, entitled "Using Deep Learning and Structure-From-Motion Techniques To Generate 3d Point Clouds From 2d Data," and filed on Sep. 24, 2020, which claims priority to U.S. Provisional Application No. 62/972,987, entitled "Using Deep Learning And Structure-From-Motion Techniques To Generate 3d Point Clouds From 2d Data" and filed on Feb. 11, 2020, the entire disclosure of which is incorporated herein by reference.

FIELD OF THE DISCLOSURE

The present disclosure is generally directed to methods and systems for using deep learning and structure-from-motion techniques to generate three-dimensional point clouds from two-dimensional data, and more particularly, to techniques for analyzing a plurality of two-dimensional images corresponding to a scene using a trained deep artificial neural network to identify tie points, and combining the labeled points using structure-from-motion techniques.

BACKGROUND

Structure-from-motion (SFM) is a conventional technique for generating three-dimensional (3D) models from two-dimensional (2D) images. Conventionally, colorspace information may be retained during SFM, and other information, such as image metadata, may be discarded. The 3D model resulting from a SFM process may not include additional information. A company or user may analyze the 3D model resulting from a SFM process for various purposes, and the analysis may require difficult programming wherein the developer works directly with 3D data. 3D data may be stored contiguously in memory, further complicating programming tasks. Conventional techniques may have additional drawbacks as well.

BRIEF SUMMARY

The present techniques relate to, inter alia, techniques for automatically identifying the meaning of 2D image data at a pixel level. In one aspect, a server may include one or more processors and/or associated transceivers; and a memory storing instructions that, when executed by the one or more processors and/or associated transceivers, cause the server to (1) receive a plurality of two-dimensional images corresponding to a scene; (2) analyze each of the plurality of two-dimensional images corresponding to the scene using a trained deep artificial neural network to generate a respective set of one or more labeled points; (3) process the set of labeled points to identify one or more tie points; and/or (4) combine the two-dimensional images corresponding to the scene into the three-dimensional point cloud using a structure-from-motion technique, wherein the combining may include combining the respective one or more labeled points according to a voting algorithm. The instructions may direct, and/or the server may be configured with, additional, less, or alternate functionality, including that discussed elsewhere herein.

In another aspect, a computer-implemented method for generating a semantically-segmented three-dimensional point cloud from two-dimensional data may include, via one or more processors and/or associated transceivers, (1) receiving a plurality of two-dimensional images corresponding to a scene; (2) analyzing each of the plurality of two-dimensional images corresponding to the scene using a trained deep artificial neural network to generate a respective set of one or more labeled points; (3) processing the set of labeled points to identify one or more tie points; and/or (4) combining the two-dimensional images corresponding to the scene into the three-dimensional point cloud using a structure-from-motion technique, wherein the combining may include combining the respective one or more labeled points according to a voting algorithm. The method may include additional, less, or alternate actions, including those discussed elsewhere herein.

In yet another aspect, a non-transitory computer readable medium may include program instructions that when executed, cause a computer to (1) receive a plurality of two-dimensional images corresponding to a scene; (2) analyze each of the plurality of two-dimensional images corresponding to the scene using a trained deep artificial neural network to generate a respective set of one or more labeled points; (3) process the set of labeled points to identify one or more tie points; and/or (4) combine the two-dimensional images corresponding to the scene into the three-dimensional point cloud using a structure-from-motion technique, wherein the combining may include combining the respective one or more labeled points according to a voting algorithm. The instructions may direct additional, less, or alternate functionality and actions, including those discussed elsewhere herein.

BRIEF DESCRIPTION OF THE DRAWINGS

The Figures described below depict various aspects of the system and methods disclosed therein. It should be understood that each Figure depicts one embodiment of a particular aspect of the disclosed system and methods, and that each of the Figures is intended to accord with a possible embodiment thereof. Further, wherever possible, the following description refers to the reference numerals included in the following Figures, in which features depicted in multiple figures are designated with consistent reference numerals.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Overview

The embodiments described herein relate to, inter alia, computer-implemented methods and computer systems for using deep learning and structure-from-motion techniques to generate three-dimensional point clouds from two-dimensional data.

In some embodiments, a series of 2D images may be collected. The images may be processed using a trained deep artificial neural network (DNN). The output of the DNN may be a class prediction for each pixel of each respective image. The images may be analyzed using a structure-from-motion technique to generate a 3D point cloud, wherein the 3D point cloud may include a colorspace (e.g., R, G, and B) value, a pixel value (e.g., an X, Y, and Z positional value) and a vector of class predictions corresponding to a set of predetermined classes. In some embodiments, a pixel may correspond to multiple class predictions, and the present techniques may select a final class by a pluralistic voting algorithm. For example, the same pixel, p may be visible in a number of images (e.g., three), and the trained DNN may identify the type of the pixel with respect to the three images as follows (tree, tree, animal). The voting algorithm may select the label corresponding to the majority of labels (i.e., tree in the example).

Exemplary Computing Environment

Figure 1:
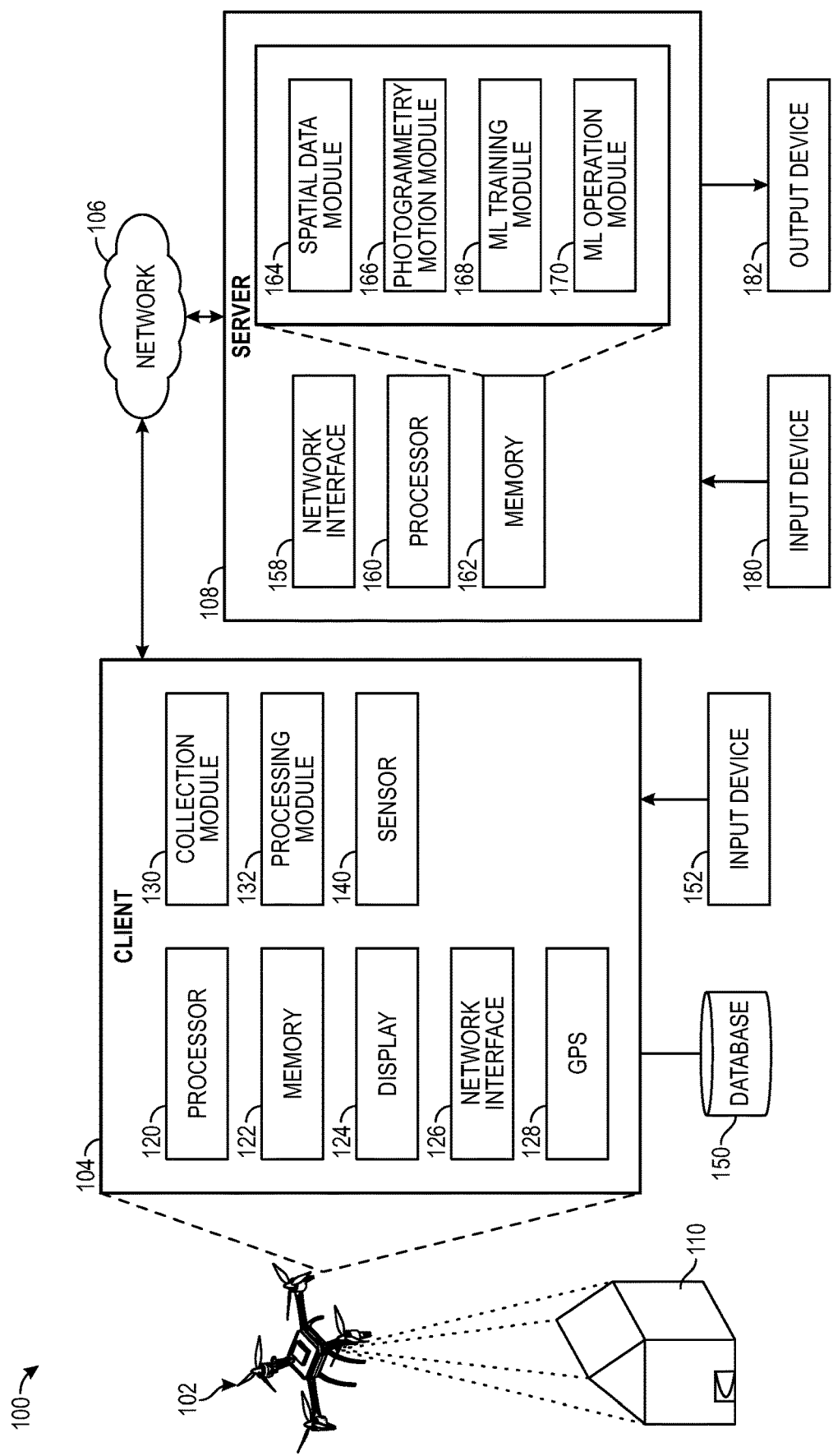
FIG. 1 depicts an exemplary computing environment in which techniques for using deep learning and structure-from-motion techniques to generate three-dimensional point clouds from two-dimensional data may be implemented, according to one embodiment.

FIG. 1 depicts an exemplary environment 100 for implementing, inter alia, using deep learning and structure-from-motion techniques to generate 3D point clouds from 2D data.

The environment 100 may include an unmanned aerial vehicle (i.e., a drone) 102 in communication with a client computing system 104, a network 106, and a server 108. The drone 102 may capture image data of one or more structure 110, for example. In some embodiments, the structure 110 may be another object, of a different scale/size.

The drone 102 is remote from the server 108 and may be any suitable unmanned aerial vehicle. For example, the drone 102 may include a lightweight (e.g., Magnesium alloy) frame, one or more interchangeable cameras including 5.2K (or higher) video and supporting video codecs (e.g., CinemaDNG, ProRes, etc.). The drone 102 may include a high-speed camera, and other features such as obstacle detection/avoidance. The drone 102 may include landing gear. The one or more cameras of the drone may be rotatable. The drone 102 may be programmable and/or operator controlled, and may include a first person video pilot camera.

The drone 102 may be purchased as a commercial-off-the-shelf (COTS) product or custom built. In some embodiments, the present techniques may be utilized by an entity (e.g., a government/military) using proprietary drone 102 hardware that is not available for purchase by the general public. The drone 102 may capture 2D and/or 3D video data to a local storage device and/or stream the video data to another component of the environment 100, such as the server 108, via the network 106. While FIG. 1 depicts only a single drone 102, the drone 102 may be in communication with numerous other drones similar to the drone 102 and/or a command drone, via the network 106 and/or other networks.

The network 106 may include any suitable combination of wired and/or wireless communication networks, such as one or more local area networks (LANs), metropolitan area networks (MANs), and/or wide area network (WANs). As just one specific example, the network 106 may include a cellular network, the Internet, and a server-side LAN. As another example, the network 106 may support a cellular (e.g., 4G, 5G, etc.) connection to a mobile computing device of a user and an IEEE 802.11 connection to the mobile computing device. While referred to herein as a "server," the server 108 may, in some implementations, include multiple servers and/or other computing devices. Moreover, the server 108 may include multiple servers and/or other computing devices distributed over a large geographic area (e.g., including devices at one or more data centers), and any of the operations, computations, etc., described below may be performed in by remote computing devices in a distributed manner.

The client 104 may include hardware and software components implemented in one or more devices permanently and/or temporarily affixed to, or otherwise carried on or within, the drone 102. For example, some or all of the components of the 104 may be built into the drone 102 or affixed elsewhere within/on the drone 102 (e.g., via a USB or other data port of the drone 102). In one embodiment, a portion of the client 104 may be implemented using a mobile computing device (e.g., a smart phone of the user). The client 104 may include specialized hardware (e.g., one or more sensors) and computer-executable instructions for retrieving/receiving drone video data from the drone 102.

In some cases, the client 104 may be implemented using components of the drone 102 and a mobile computing device. The client 104 may include a processor 120, a memory 122, a display 124, a network interface 126, and a global positioning system (GPS) unit 128. The processor 120 may be a single processor (e.g., a central processing unit (CPU)), or may include a set of processors (e.g., a CPU and a graphics processing unit (GPU)).

The memory 122 may be a computer-readable, non-transitory storage unit or device, or collection of units/devices, that may include persistent (e.g., hard disk) and/or non-persistent memory components. The memory 122 may store instructions that are executable on the processor 120 to perform various operations, including the instructions of various software applications and data generated and/or used by such applications. In the exemplary implementation of FIG. 1, the memory 122 stores at least a collection module 130 and a processing module 132. Generally, the collection module 130 is executed by the processor 120 to facilitate collection of video data from the drone 102 and the processing module 132 is executed by the processor 120 to facilitate the bidirectional transmission of drone data (e.g., a still image, image metadata such as IMU, etc.) between the client 104 and the server 108 (e.g., sending drone data collected from the drone 102 to the server 108, receiving instructions related to the collection of data from the server 108, receiving/retrieving drone data, etc.).

The display 124 may include hardware, firmware and/or software configured to enable a user to interact with (i.e., both provide inputs to and perceive outputs of) the client 104. For example, the display 124 may include a touchscreen with both display and manual input capabilities. In some embodiments, the client system 104 may include multiple different implementations of the display 124 (e.g., a first display 124 associated with the drone 102 and a second display 124 associated with a mobile computing device of the user).

The network interface 126 may include hardware, firmware and/or software configured to enable the drone 102 and/or client 104 to wirelessly exchange electronic data with the server 108 via the network 106. For example, network interface 126 may include a cellular communication transceiver, a WiFi transceiver, and/or transceivers for one or more other wireless communication technologies (e.g., 4G).

The GPS unit 128 may include hardware, firmware and/or software configured to enable the client 104 to self-locate using GPS technology (alone, or in combination with the services of server 108 and/or another server not shown in FIG. 1). Alternatively, or in addition, the client 104 may include a unit configured to self-locate, or configured to cooperate with a remote server or other device(s) to self-locate, using other, non-GPS technologies (e.g., IP-based geolocation).

In some embodiments, the collection module 130 (or other software stored in the memory 122) provides functionality for collecting drone data from the drone 102. Drone data may include one or more images captured from a capture device, GPS location data, or other metadata (e.g., IMU). The collection module 130 may include instructions for accessing a bus or API of the drone 102 to retrieve/receive the drone data. The collection module 130 may receive/retrieve the drone data in real time as the data is generated by the drone 102, in batches (e.g., periodically every N minutes or more frequently, wherein N is a positive integer) and/or at the end of a drone 102 flight session. When the collection module 130 is integral to the drone 102, the collection module 130 may access the drone data via a wired connection. When the collection module is not integral to the drone but is integral to another component (e.g., a mobile device of the user), the collection module 130 may access the drone data via a wireless connection (e.g., WiFi internet, Bluetooth, etc.).

Using the drone 102 advantageously allows the operator of the present techniques to fly more frequently and cost-effectively than manned aircraft/satellite imaging. For example, the imaging may be updated daily/weekly or, in some cases, more frequently. Moreover, data may be processed as it is captured by the drone, decreasing overall latency of the environment 100.

The processing module 132 provides functionality for processing drone data from the drone 102. The processing module 132 may retrieve/receive data from the collection module 132 and may transmit data to/from the database 136. The processing module 132 may transmit data to/from the server 108. The collection module 130 may collect data from one or more sensors and may store collected data in the database 150.

The drone 104 may further include a sensor 140, an electronic database 150, and an input/output device 152. The sensor 140 may include one or more sensors associated with the drone 102 (e.g., an airspeed sensor) and/or a mobile device of the user (e.g., an accelerometer). The sensor 140 may provide data (e.g., sensor readings) to applications (e.g., the collection module 130). Many types of sensors may be used, such as cameras, video cameras, and/or microphones. In some embodiments, sensors may read particular drone data.

The database 150 may be any suitable database (e.g., a structured query language (SQL) database, a flat file database, a key/value data store, etc.). The database 150 may include a plurality of database tables for storing data according to data storage schema. The database 150 may include relational linkages between tables, and may allow complex data types such as image blob data to be stored and queried.

The I/O device 152 may include hardware, firmware and/or software configured to enable a user to interact with (i.e., both provide inputs to and perceive outputs of) the client 104. For example, the display 124 may include a touchscreen with both display and manual input capabilities. In some embodiments, the I/O device 152 may include a keyboard, one or more speakers, a microphone, etc. Via the I/O device 152, the user may configure instructions that cause the client 104 to transmit drone data to the server 108 via the network 106.

In some embodiments, the I/O device 152 and/or another module may include instructions for sending/receiving remote control instructions from a user. For example, the user may use the drone 102 remote controller (not depicted) that is coupled to the drone wirelessly to navigate/pilot the drone 102, and/or to view live aerial video of the drone 102.

The server 108 may include a network interface 158, a processor 160, and a memory 162.

The network interface 158 may include hardware, firmware and/or software configured to enable the server 108 to exchange electronic data with the telematics system 104 via network 106. For example, network interface 158 may include a wired or wireless router and a modem. The processor 160 may be a single processor (e.g., a central processing unit (CPU)), or may include a set of processors (e.g., a CPU and a graphics processing unit (GPU)).

The memory 162 is a computer-readable, non-transitory storage unit or device, or collection of such units/devices, that may include persistent (e.g., hard disk) and/or non-persistent memory components. The memory may store one or more modules comprising sets of computer-executable instructions, such as a spatial data module 164, a photogrammetry motion module 166, a machine learning training module 168, and a machine learning operation module 170. The memory 162 may store data generated and/or used by the modules.

The spatial data module 164 may receive/retrieve data from the processing module 132 of the client 104. Specifically, the spatial data module 164 may receive/retrieve drone data (e.g., 2D images, 3D images, and image/drone metadata). The spatial data module 164 may store the received/retrieved data/metadata in the memory 162 and/or in another location (e.g., in an electronic database). The spatial data module 164 may include instructions for associating video data with other data (e.g., metadata). For example, the spatial data module 164 may associate one or more image with a respective GPS location and/or IMU information received from the client 104. The spatial data module 164 may provide data to the photogrammetry motion module 166.

The photogrammetry motion module 166 may include instructions for generating 3D point clouds from 2D image data. The photogrammetry motion module 166 may be used to generate a 3D model using 2D drone data captured by an image capture device of the drone 102. Once the drone 102 has captured several images corresponding to a scene, the photogrammetry motion module 166 may generate a 3D point cloud corresponding to the scene by analyzing the 2D drone data. The 3D point cloud may be stored in an electronic database, wherein the 3D point cloud is usable by other modules (e.g., the ML training module 168) for various purposes.

The ML training module 168 is generally configured to load, create, train, and/or store ML models for use by the server 108 and/or the client 104. For example, the ML training module 168 may include instructions for training a deep learning artificial neural network ML model by analyzing labeled 2D photos, as described below. Specifically, the ML training module 168 may train a deep learning model to categorize each pixel of an input 2D image.

For example, pixel labels/categories may include "Ground," "Pavement," "Building," "Man-made object," "Low vegetation," "Medium vegetation," "High vegetation," etc. A user may label training images using ground truth information (i.e., labels) by, for example, encircling objects and then selecting a label from a pre-determined list, and/or by typing the name of a new label (e.g., via the input device 152 of FIG. 1). In some embodiments, the classes used for labeling may be based upon standard classifications (e.g., a LAS LIDAR standard).

In some embodiments, labeled data used for training may include one or more images including colorspace (e.g., RGB) values, wherein the user has manually marked/identified objects of interest (e.g., a 2D shape) and assigned a scalar to the shape. For example, some scalar labels are: "Building=>0, Tree=>1." The labeled data may be split into training and testing data sets, having for example, a 5:2 ratio.

In some embodiments, only categories relevant to a particular use case may be chosen. It should also be appreciated that in some embodiments, as few as one class may be used, such as in outlier detection use cases. For example, a ML model may be trained to generate an outlier label when an output is determined by the trained model to be outside of a normal/reasonable bound. In such cases, the model may be trained as a one-class support vector machine (SVM), wherein the distance of each point is fitted to a hyperplane, and the distance of each point to the hyperplane is analyzed as a proxy to the outlier.

The ML training module 168 may retrieve/receive a data set including one or more 2D images corresponding to a physical scene, wherein one or more pixels in the 2D images are labeled. The ML training module 168 may use as ground truth data the 2D images including the respective pixel labels. The ML training module 168 may train a ML model to analyze an image including a matrix of pixels corresponding to the image. The ML training module 168 may analyze a predefined list of categories (e.g., a building, a tree, a car, etc.). The ML training module 168 may assign a category to each pixel of the image and/or assign a probability to each label with respect to each pixel, wherein the probabilities sum to one. For example, given three labels A, B and C, the ML training module 168 may train the ML model to analyze a pixel and assign the following vector of probabilities to the pixel: (A=>0.1, B=>0.3, C=>0.6). The ML model may assign a vector of probabilities to each pixel in the image.

In general, the ML training module 168 may train models by, inter alia, establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned," values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs. For example, a deep learning ANN may be trained using point clouds to generalize about previously unseen point clouds.

The ML operation module 170 may load a model (e.g., a deep learning model) trained by the ML training module 168 from the memory 162 or another location. For example, the ML operation module 170 may load a trained ML model and pass a series of parameters (e.g., a matrix of pixels corresponding to an image). The ML operation module 170 may receive from the trained deep learning model a copy of the matrix wherein each pixel is associated with a category/class label. The matrix including the respective pixel labels may be stored in the memory of the server 162 or in another location (e.g., in an electronic database of the server 108).

The server 180 further may include an input device 180 and an output device 182. The input device 180 may include hardware, firmware and/or software configured to enable a user to interact with (i.e., provide inputs to) the server 108. The output device 182 may include hardware, firmware and/or software configured to enable a user to interact with (i.e., provide inputs to) the server 108. By using the input device 180 and the output device 182, the user may configure the modules of the server 108, inspect data stored in the memory 162 of the server 180, and perform other operations.

In operation, a user may cause the drone 102 to overfly a scene. The drone 102 may follow a pre-determined flight path programmed into the memory 122 of the drone 102 and/or may be piloted remotely by the user. For example, the user may override the pre-programmed drone 102 flight path. The collection module 130 of the drone 102 may capture images of the scene according to a pre-determined logic/time interval, and/or at the initiation of the user (e.g., via the remote control). The collection module 130 may capture 2D images. The processing module 132 may transmit the captured 2D images and/or additional data respective to each image (e.g., GPS coordinates, metadata, etc.) immediately or after a delay to the server 108 via the network 106. For example, the captured images may be planar images corresponding to a scene.

The spatial data module 164 may receive the images and/or data. The spatial data module 164 may associate the images and/or data by, for example, adding a sequential identifier to each image. The spatial data module 164 may store the images in an electronic database such that the sequential orientation is preserved. In some embodiments, the spatial data module 164 may analyze the 2D images and reject/discard those for which no metadata is available, or those which are corrupted/blank or blurred.

Once the spatial data module 164 has stored the images, the trained ML model may analyze each image to annotate each pixel in each image with a vector of labels, as discussed above. The output of the trained ML model may be a matrix of points wherein each point may include a pixel value, a colorspace (e.g., an R, G, and B value) value, and the category/class information.

Conventionally, during structure-from-motion processing, also known as triangulation of common pixels, RGB values may be kept while other information (e.g., metadata) is discarded. The present techniques advantageously improve such conventional techniques by semantically segmenting planar images and carrying the category information through to subsequent processing steps. For example, a ML model may process five planar images, labeling each point (i.e., pixel) within the respective five planar images with a category, or type. Some of the five planar images (e.g., three of the five) may include a common label for a particular pixel (e.g., "building") while a fourth image labels the particular pixel as another category (e.g., "pavement" or "tree"). The differences in labeling of common points may be due to various factors, such as the respective distance of the capture devices while capturing the planar images, perspective of the capture devices while capturing the planar images, etc. The present techniques may use a voting algorithm when combining planar images by tie points such that the final output may include the common label according to the three planar images (i.e., building). In this way, errors in labeling are eliminated by consensus.

The ML operation module 170 may operate the trained ML model. The ML operation module 170 may receive an image and analyze the image using the trained ML model to generate a vector of labels for each pixel of the image. Once the trained ML model has generated a vector of labels, each including a respective probability for each pixel of an input image, the spatial data module 164 may store the annotated image including the respective pixel labels on a storage medium (e.g., the memory 162 of FIG. 1). Once a set of images corresponding to a scene are annotated, the photogrammetry motion module 166 may analyze the images to generate a 3D point cloud. The photogrammetry motion module 166 may utilize structure-from-motion techniques to plot points in the 3D point cloud from overlapping points (e.g., tie points) within multiple of the 2D images stored by the spatial data module 164.

The photogrammetry motion module 166 may store the generated 3D point cloud in the electronic database, optionally in association with the plurality of 2D images used to generate the 3D point cloud. A user may rotate the generated 3D point cloud and view the point cloud in 3D space. Each point in the point cloud may include a 3D coordinate value (e.g., X,Y,Z), an R,G,B color value, and one or more labels taken from the images used to create the tie points. Once the 3D point cloud is generated, the ML operation module 170 may further analyze the 3D point cloud. Model training and topology are described further below.

Exemplary Scene Capture

Figure 2A:
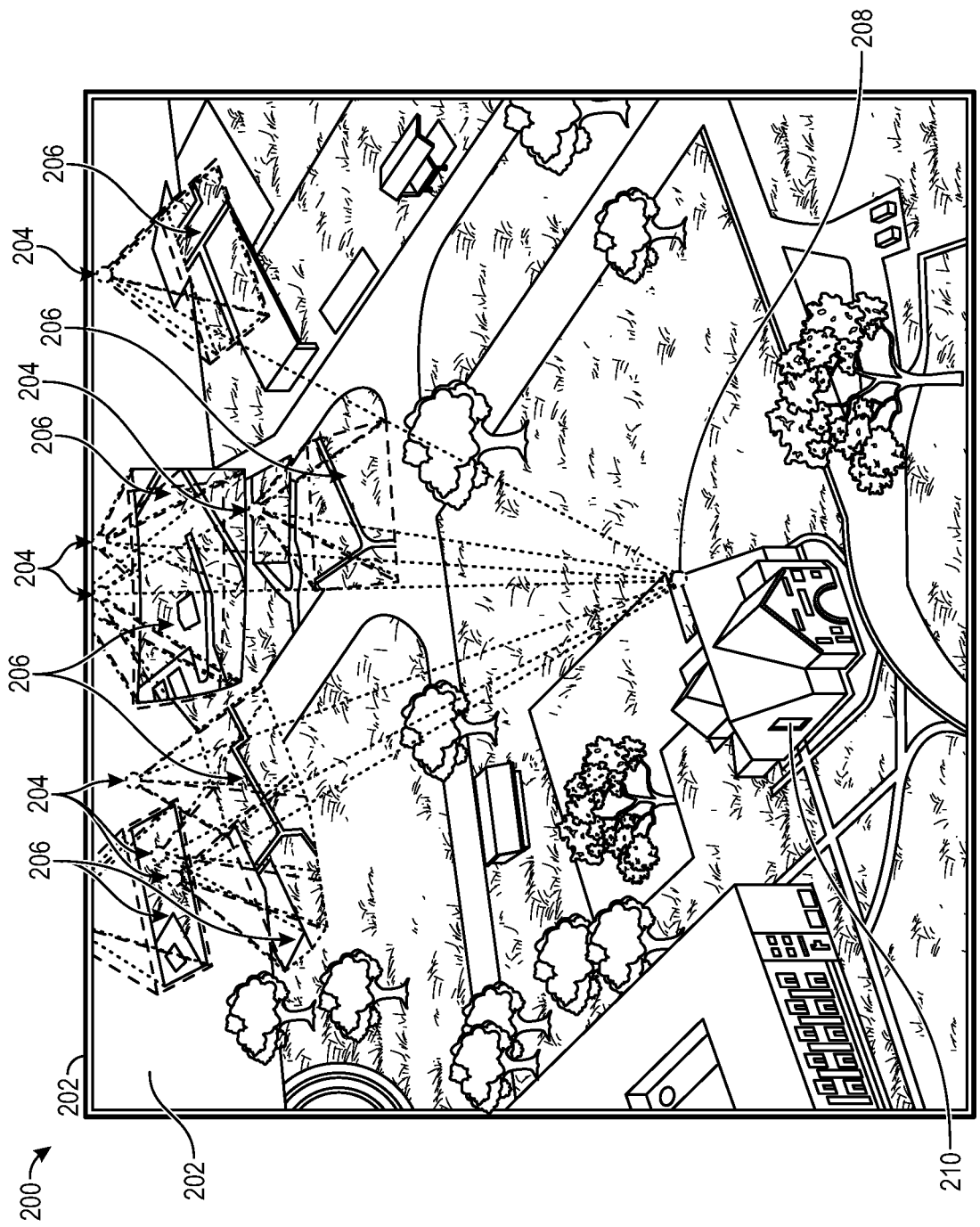
FIG. 2A depicts an exemplary environment including a 3D scene constructed by performing structure-from-motion techniques, according to one embodiment.

FIG. 2A depicts an exemplary environment 200 including a 3D scene 202 constructed by performing structure-from-motion techniques. The scene 202 include one or more of capture locations 204 and one or more respective planar images 206, wherein each of the respective planar images 206 corresponds to one of the capture locations 204. Each of the capture locations 204 may correspond to a tie point 208. Each of the capture locations 204 may correspond to a capture device of a flight device (e.g., a camera of a drone, such as the drone 102). The tie point 208 is a single recognizable feature of a structure 210 that each of the flight devices at each of the capture locations 204 have a vantage of. For example, the tie point 208 may correspond to a single feature of the structure 110 or the structure 210, such as a church steeple.

It should be appreciated that the tie point may correspond to any pixel or collection of pixels that the planar images 206 commonly include. In one embodiment, a capture device at a location 204 may not have a clear view of the tie point 208. In that case, the photogrammetry motion module 166 may analyze the planar image 206 and discard the planar image 206 generated by the capture device. Each respective capture location 204 may include a line connecting the capture location 204 to the tie point 208 and additional lines of sight connecting the capture location 204 to the edges of a planar image 206. The lines of sight of each capture location 204 may depict a visualization of where the capture device was located when it captured the planar image 206 corresponding to the structure 210. In certain embodiments wherein point clouds are generated using structure-from-motion techniques, the photogrammetry motion module 166 may analyze the planar images 206 to generate a point cloud. Lines of sight are further discussed with respect to FIG. 4, below.

In the example of FIG. 2A, the steeple of the structure 210 is the tie point 208. The photogrammetry motion module 166 may include instructions for determining as many tie points 208 (e.g., trees, people, buildings, etc.) as possible from multiple images. For example, a point A and a point B may be visible in a first planar image 206 and a second planar image 206, but appear in the respective planar images 206 to be of different perspective, due to differing locations of the respective capture devices used to capture the planar images 206. The photogrammetry motion module may include instructions for extrapolating the connections between the point A and the point B and other points many times (e.g., hundreds of thousands/millions) to construct a collection of points observed from multiple perspectives. The photogrammetry motion module 166 may determine the source of change relative to one another of the points A and B, and save the source of change as the 3D space the points lie in. Once enough images are captured, the photogrammetry motion module 166 may find multiple tie points 208, allowing triangulation of pixels per image in a 3D space/environment from 2D images (i.e., a 3D point cloud).

The photogrammetry motion module 166 may include instructions for tagging the 3D point cloud with additional image data for increasing density of the 3D point cloud. The photogrammetry motion module 166 may tag each 3D point in the 3D point cloud with geospatial metadata (X,Y,Z) and one or more scalar values (e.g., color or other metadata). For example, enhanced GPS (e.g., 2.5 cm accuracy) data may be collected by the drone and added to the 3D point cloud. Data from the drone 102 inertial measurement unit (IMU) may also be collected. The present techniques advantageously allow analysts to attain 3D spatial awareness (e.g., elevation) by building a 3D scene including x,y,z and color values at each respective coordinate from 2D images.

Figure 2B:
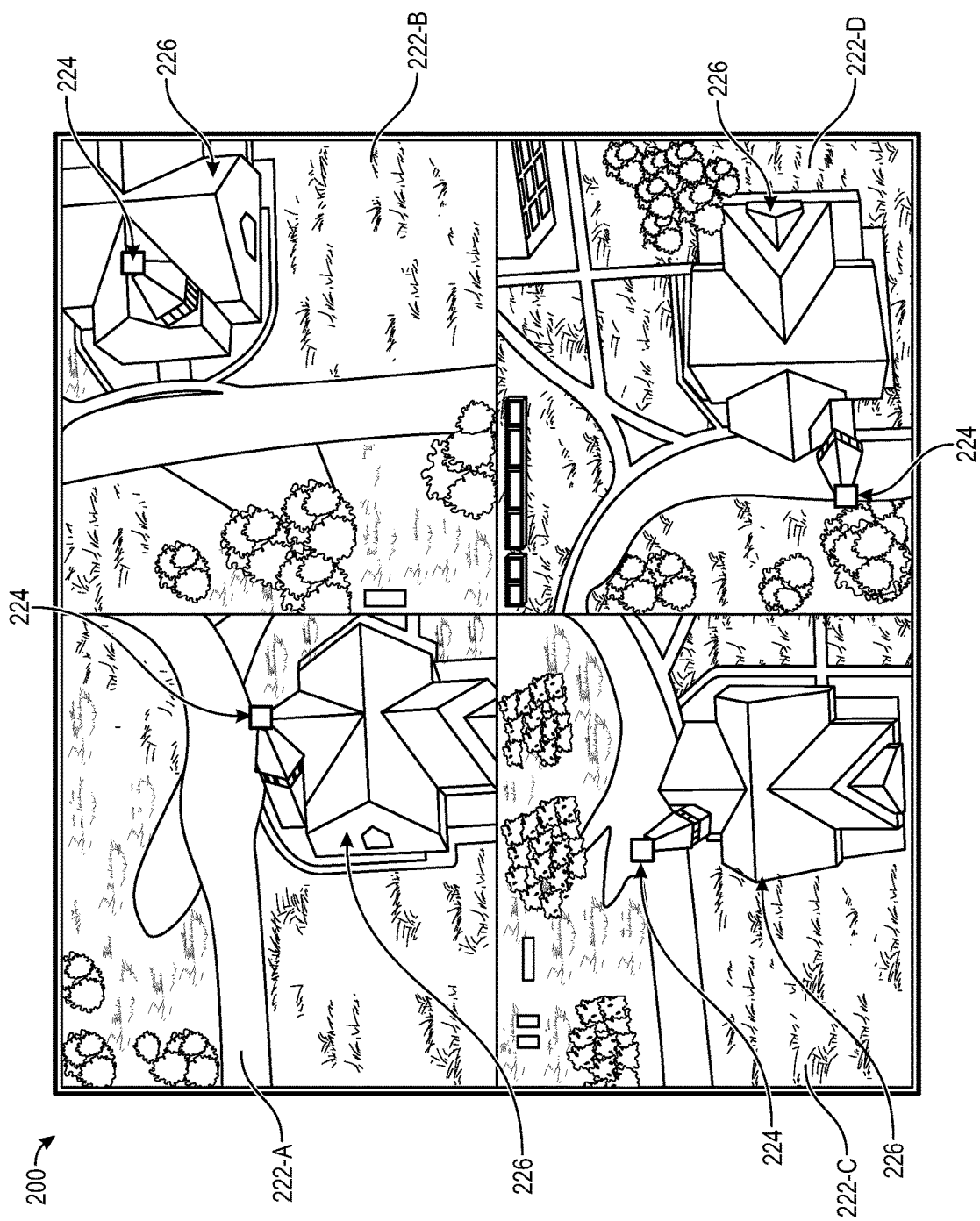
FIG. 2B depicts an exemplary environment including a plurality of scenes corresponding to the scene of FIG. 2A, according to one embodiment.

FIG. 2B depicts an exemplary environment 200 including scenes 222-A-222-D, wherein each of the scenes 222-A through 222-D may correspond to the scene 202. For example, the scenes 222-A through 222-D include a respective tie point 224 that corresponds to the tie point 208, and a respective structure 226 that corresponds to the structure 210 of FIG. 2A and the structure 110 of FIG. 1, for example.

The capture device (e.g., the drone 110 of FIG. 1) may include instructions for capturing (or may be controlled/programmed to capture) images of the scene 202 from a perspective that is perpendicular to the ground (i.e., straight down), as depicted in FIG. 2B. The capture device may include overlap between the scenes 222-A through 222-D, such that one or more points (i.e., tie points) are captured in multiple images.

Exemplary Deep Learning Artificial Neural Network

Figure 3:
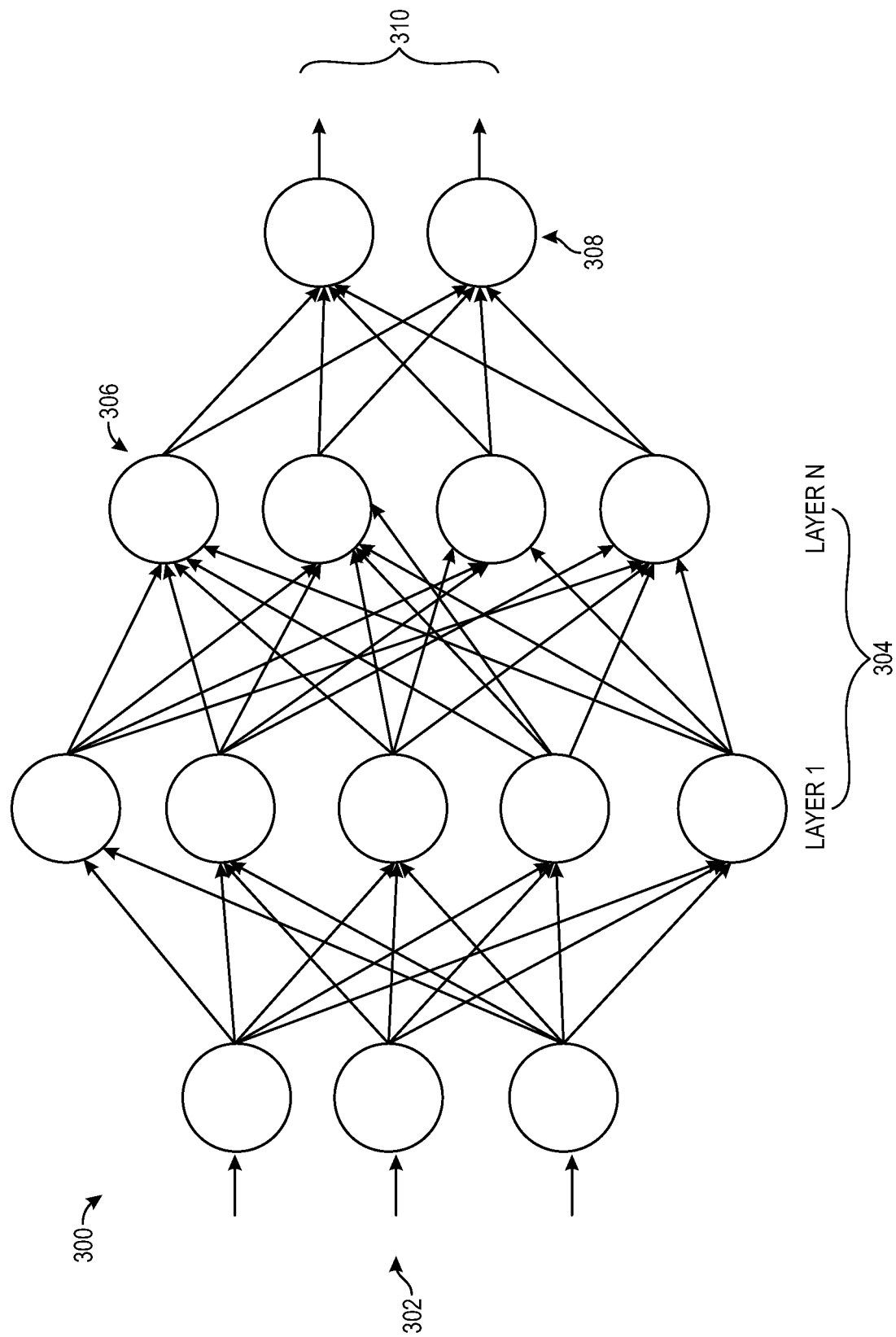
FIG. 3 depicts an exemplary deep learning artificial neural network, according to one embodiment.

FIG. 3 depicts an exemplary deep learning artificial neural network (DNN) 300. The DNN 300 may be trained by the ML training module 168 of FIG. 1, for example. The DNN 300 may be operated by the ML operation module 170 of FIG. 1, for example. The DNN 300 may include a plurality of layers, each of which include any number of respective neurons, or nodes. The DNN 300 may include an input layer 302, one or more hidden layers 304, and an output layer 308.

Each of the layers in the DNN may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of DNNs are possible.

The input layer 302 may correspond to a large number of input parameters (e.g., one million inputs), in some embodiments, and may be analyzed serially or in parallel. Further, various neurons and/or neuron connections within the DNN may be initialized with any number of weights and/or other training parameters. Each of the neurons in the hidden layers 304 may analyze one or more of the input parameters from the input layer 302, and/or one or more outputs from a previous one or more of the hidden layers 304, to generate a decision 310 or other output. The output layer 308 may generate the decision 310 or more outputs, each indicating a prediction or an expected value. The number of input neurons may be stored as a predetermined value, and used to initialize a network for training.

In some embodiments and/or scenarios, the output layer 308 may include only a single output 310. For example, a neuron may correspond to one of the neurons in a hidden layer 306. Each of the inputs to the neuron may be weighted according to a set of weights W1 through Wi, determined during the training process (for example, if the neural network is a recurrent neural network) and then applied to a node that performs an operation α. The operation α may include computing a sum, a difference, a multiple, or a different operation. In some embodiments weights are not determined for some inputs. In some embodiments, neurons of weight below a threshold value may be discarded/ignored. The sum of the weighted inputs, r1, may be input to a function which may represent any suitable functional operation on r1. The output of the function may be provided to a number of neurons of a previous/subsequent layer or as an output 310 of the DNN. In some embodiments, the DNN may include one or more convolutional neural network (CNN) layers.

Exemplary Photogrammetry Environment

Figure 4:
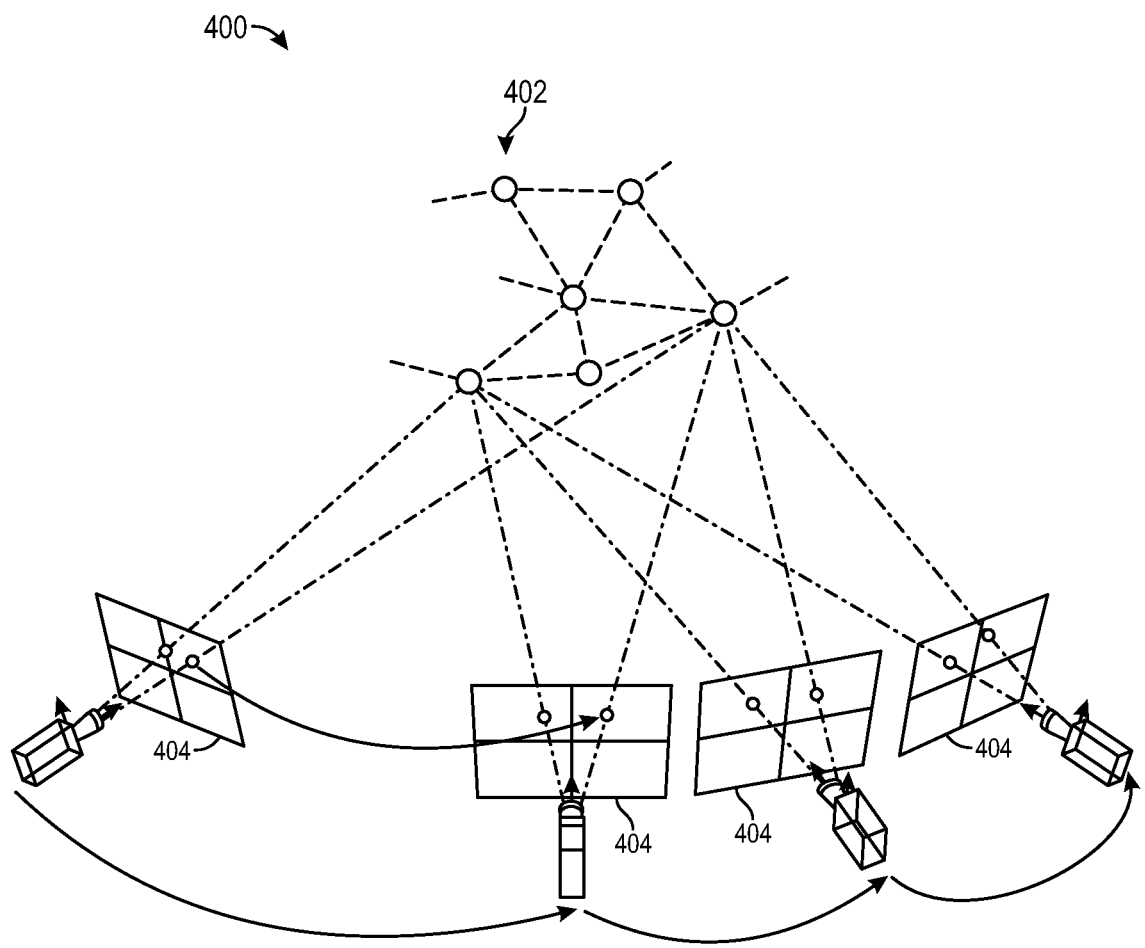
FIG. 4 depicts an exemplary photogrammetry environment, according to one embodiment.

FIG. 4 depicts an exemplary photogrammetry environment 400. The photogrammetry environment 400 may include a 3D model 402, constructed by a series of planar images 404 being captured by a capture device (e.g., a camera of the drone 102 of FIG. 1). Each of the planar images 404 may correspond, for example, to the planar images 206 of FIG. 2A. The 3D model 402 may correspond to the point cloud of the 3D scene 202 of FIG. 2A. FIG. 4 depicts corresponding feature points of each planar image 206, which may correspond to the tie points 208 of FIG. 2A.

Figure 5:
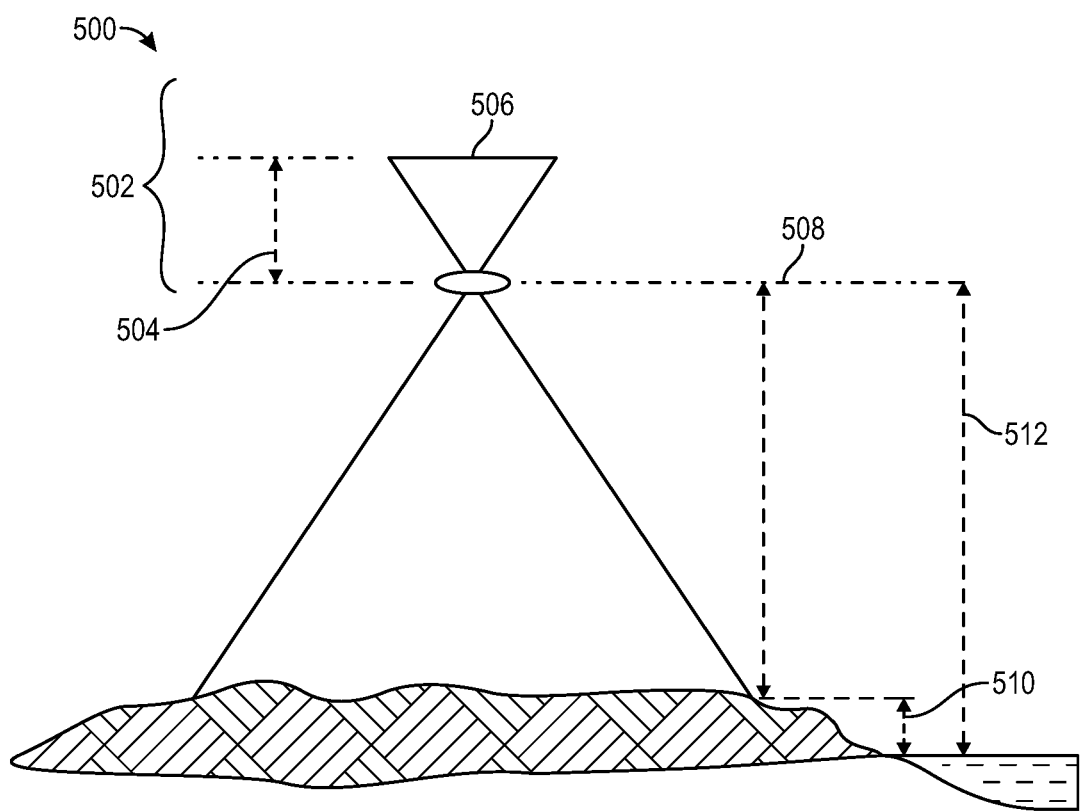
FIG. 5 depicts an exemplary photogrammetry environment, according to one embodiment.

FIG. 5 depicts an exemplary photogrammetry environment 500. The photogrammetry environment 500 may include a capture device 502. For example, the capture device may be onboard the drone 102 of FIG. 1. The capture device 502 may include a focal length and focal plane as determined by a lens 504. The lens 504 may be located a distance 508 above terrain (e.g., the ground, sea level, etc.). The distance above terrain 508 may be measured as a distance 512 measured relative to sea level 510. The scale of the image captured using the photogrammetry environment 500 may be calculated by computing the ratio of the focal length of the lens 504 of the camera 502 to the height above terrain 508.

Exemplary Point Clouds

Figure 6A:
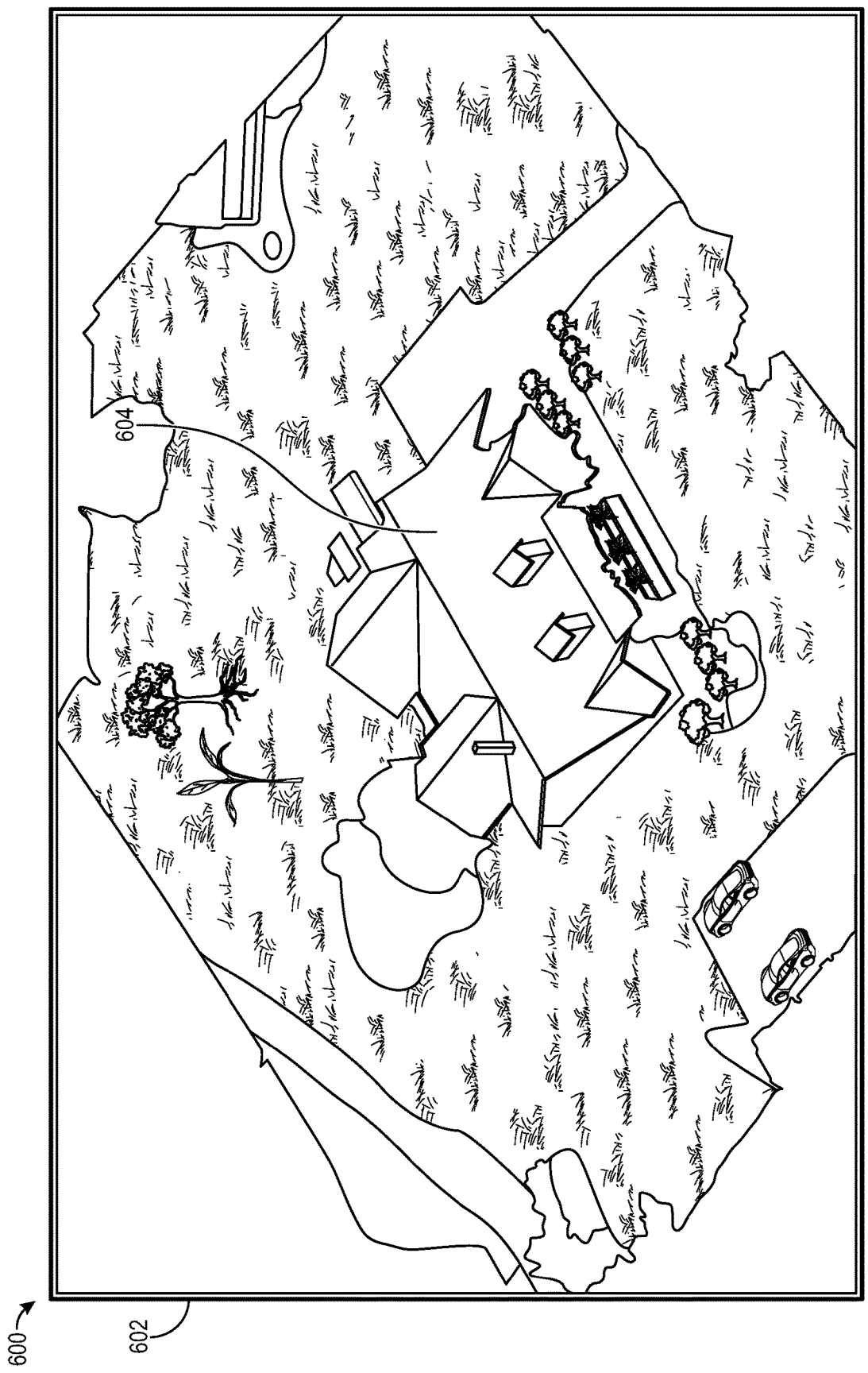
FIG. 6A depicts an exemplary 3D point cloud including RGB colorspace information, according to one embodiment.

FIG. 6A depicts an exemplary 3D point cloud 602 including colorspace information, according to one embodiment. The exemplary 3D point cloud 602 may be rotated and viewed in 3D space. Each point in the exemplary 3D point cloud 600 may include an X,Y,Z coordinate used to generate the point cloud and an R,G,B color value taken from the images used to create the tie points of the exemplary 3D point cloud 602. Conventionally, such 3D point clouds may be analyzed by converting the point cloud to gray scale (i.e., by removing RGB color).

Figure 6B:
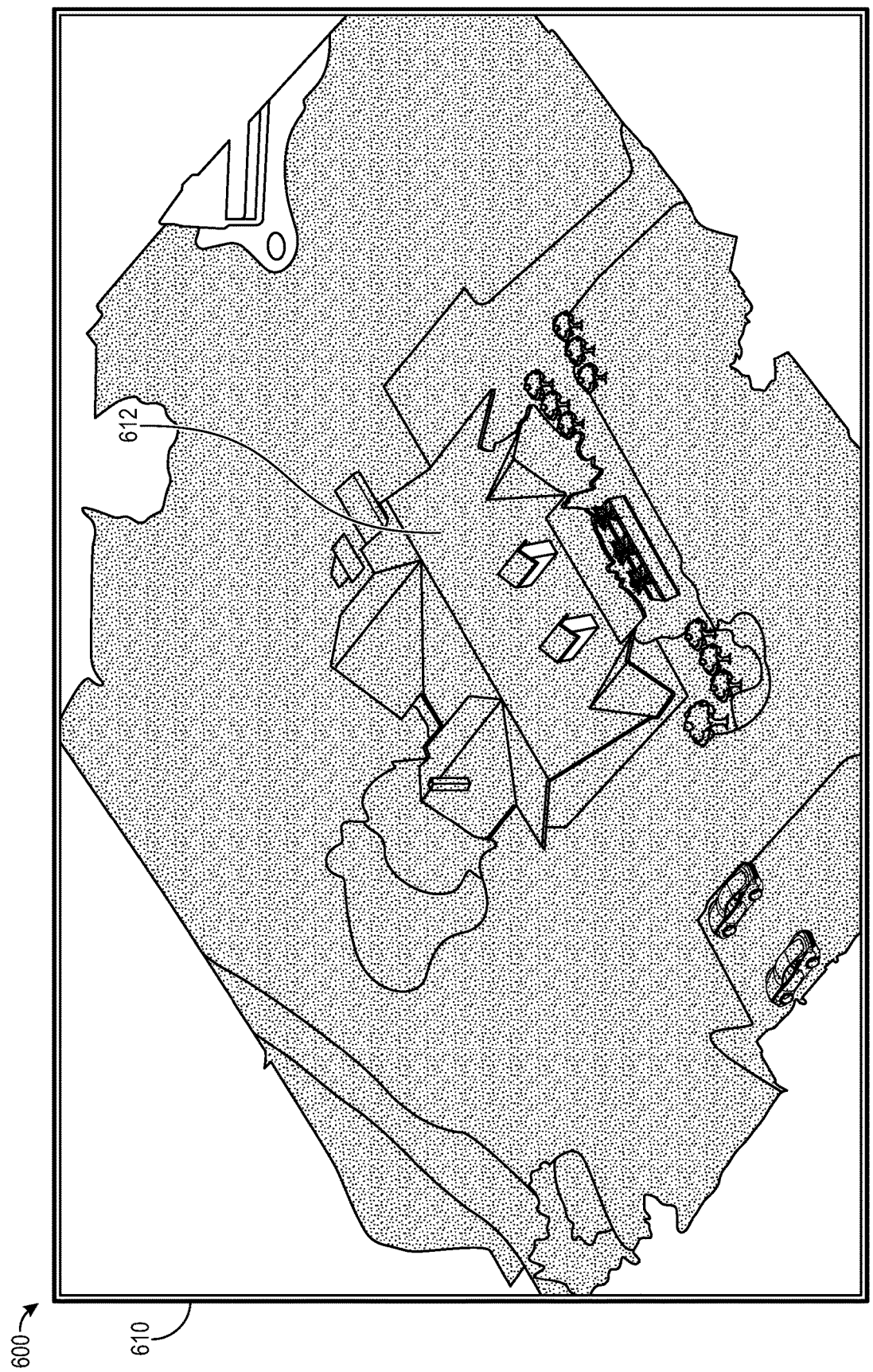
FIG. 6B depicts an exemplary 3D point cloud not including RGB colorspace information, according to one embodiment.

FIG. 6B depicts an exemplary 3D point cloud 610 not including RGB color information. The exemplary 3D point cloud 610 depicts a scene wherein differences between structures and background, for example, are difficult to perceive. The exemplary 3D point cloud 602 and 610 illustrate the starting data sets that are historically used for modeling tasks (e.g., for flood modeling).

In contrast, the present techniques do not apply a colorspace mask. Rather, the DNN of FIG. 3 may be used to process a series of 2D images. Each 2D image may be processed using the trained DNN to classify each point within each 3D images, wherein the classification may include calculating a probability that each point corresponds to a respective predetermined category (e.g., vegetation, building, animal, etc.). The categories may be modified to suit the needs of each embodiment. The DNN categorizes each point, or pixel, into a meaningful category (or a set of categories, each including a respective probability).

Once all images are processed, the pixels of each image may be combined into a set of common points. The set of common points may be represented using a system of equations, wherein each point is tracked according to which image the point appears in. For example, a first point may appear in/be common to images 1, 2, and 3. A second point may be common to images 3, 4 and 5. Each point may include positional (e.g., X, Y, and Z) information.

The relationship of every point to all other points in three dimensions may be specified by a system of equations. Solving this system of equations may provide an X,Y,Z coordinate for each point. As discussed above, once the several images are processed by the DNN, the images have been semantically segmented, such that each point of each image may include at least one category. As discussed, when combining the images to construct the 3D point cloud, there may be disagreement caused by shifts in perspective among the many planar images. In particular, disagreement may occur at boundaries where objects meet (e.g., where grass and building pixels meet) leading to a greater likelihood of confusion. For example, when analyzing the tie point 208, the multiple planar images 206 may capture different perspectives of the tie point 208.

Once the present techniques have been used to semantically segment a plurality of planar images, the planar images are combined by determining tie points, wherein determining the tie points may include combining the pixel labels into the 3D point cloud using a voting approach. Including the pixel information via voting preserves meaning in the 3D point cloud that is lost in conventional techniques. The result is a 3D point cloud wherein each point is categorized. In some embodiments, planar images are combined, or stitched together, using one or more tie points. In some embodiments, planar images are combined according to one or more pixels that are not tie points.

Figure 7:
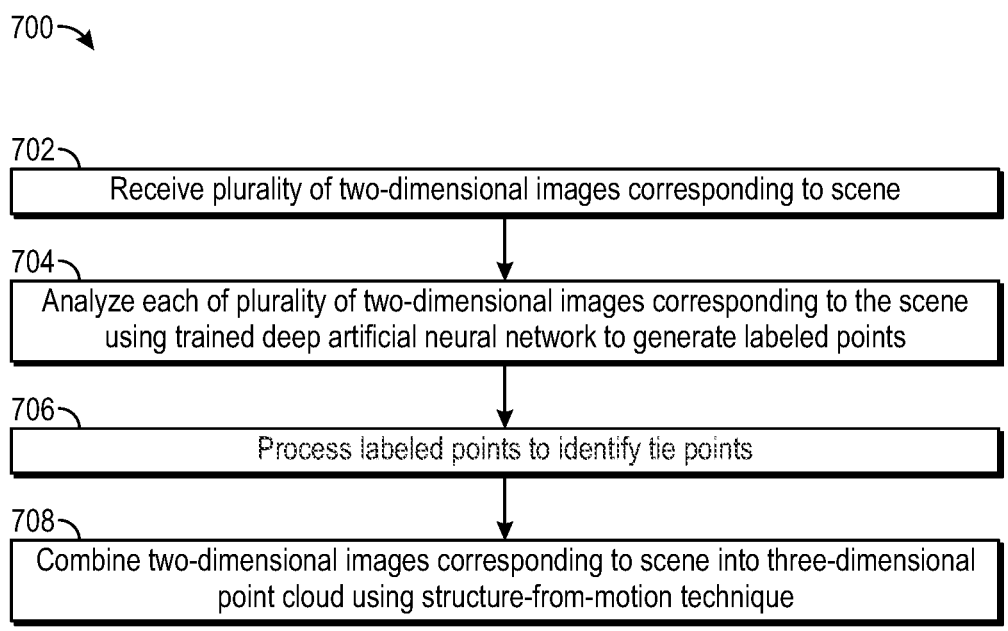
FIG. 7 depicts an exemplary computer-implemented method for using deep learning and structure-from-motion techniques to generate 3D point clouds from 2D data, according to one embodiment and scenario.

In some embodiments, one or more additional dimensions may be added to each pixel. For example, each pixel in the planar image may include a geospatial coordinate. The geospatial coordinate may be preserved when the pixels are combined, to provide more certainty of where the pixel should belong in 3D model once the planar images are combined using a structure-from-motion technique Exemplary Computer-Implemented Methods FIG. 7 depicts an exemplary computer-implemented method 700 for generating a semantically-segmented 3D point cloud. The method 700 may include receiving, from one or more drone capture devices, one or more planar images corresponding to a scene (block 702).

The method 700 may include analyzing the planar images using a trained deep artificial neural network (block 704). The analyzing may include assigning a vector of labels to each pixel within each respective planar image, each label in the vector of labels corresponding to a respective probability.

The deep artificial neural network may be trained by processing a set of labeled training images according to the principles discussed herein. For example, the set of training images may include a plurality of images, wherein each pixel of each training image corresponds to a category. The training data set may be created by a human manually annotating, or labeling, pixels within the training images. The human may annotate the image by, for example, encircling objects within the image using a stylus. In some embodiments, the labeling may be performed using an automated mechanism.

The method 700 may include processing the labeled pixels/points to identify tie points (block 706). For example, two or more images may include one or more pixels that correspond to the same point in the scene.

The method 700 may include analyzing the planar images using a structure-from-motion technique to generate a three-dimensional point cloud, wherein each pixel in the three-dimensional point cloud may include a colorspace value, a positional value, and the respective vector of labels (block 708).

In some embodiments, a pixel may correspond to multiple class predictions, and the present techniques may select a final class by a pluralistic/democratic voting algorithm. For example, a pixel corresponding to the scene, may be visible in a number of images (e.g., three), and the trained DNN may identify the type of the pixel with respect to the three images as follows (tree, tree, animal). The voting algorithm may select the label corresponding to the majority of labels (i.e., tree in the example). In other embodiments, the voting may be performed using another algorithm, such as an algorithm wherein the first label to achieve a count of two is chosen.

Exemplary Use Cases

In some embodiments, the present techniques may include the application of multiple/different deep learning techniques. For example, in some embodiments, a scene may be semantically segmented using a first ML model as discussed above, and a second ML model (e.g., a CNN) may be used to determine a roof geometry. A third ML model may be used to analyze the result of the semantic segmentation and the CNN output. The semantic segmentation information generated using the above-described techniques may be included in the 3D point cloud, and is useful for further analysis/operations in many domains.

Vehicles and Transportation

For example, additional use cases that may be implemented using the above-described techniques include transportation-related implementations such as autonomous vehicle mapping wherein, for example, an autonomous vehicle generates mapping information and aerial imagery is collected. For example, the aerial imagery may correspond to a rural areas wherein airspace is less tightly restricted. In another example, LIDAR is used in an urban/metro area.

Some embodiments may improve existing autonomous vehicle navigation and/or orientation systems. For example, the present techniques may modify an existing localization technique to provide more precise navigation by combining data from multiple systems (e.g., GPS data, LIDAR data including known landmarks, a camera system that centers on lanes, drone data, etc.). The point cloud data from each may be combined and spatially segmented using the present techniques to produce high resolution maps for the autonomous vehicle. As the autonomous vehicle operates, a module in the autonomous vehicle may analyze the spatial data in the high resolution maps (e.g., a class of an object, such as a pothole) to determine a navigation decision (e.g., a turning angle) or to provide information to a vehicle operator.

In one embodiment, a plurality of point clouds from multiple sources (e.g., the autonomous vehicle and the LIDAR data) may be merged together into a highly-accurate point cloud (e.g., 3D data accurate to 2.5 cm geospatially), advantageously minimizing the spatial error known to affect current-generation GPS-based systems. The combined point cloud may be used to provide high definition 3D maps that include elevation information for different purposes. For example, the combined 3D point cloud may be used in an autonomous vehicle implementation to detect potholes, analyze elevation differences for curbs, etc.

In one embodiment, non-color data (e.g., LIDAR) is combined with colorspace information in a point cloud. A generative adversarial network (GAN) may be used to add color information to non-color point clouds.

The present techniques may be used to implement functionality specific to the operation heavy equipment (e.g., a bulldozer, a tractor-trailer truck/semi, etc.). For example, semantic segmentation may be used to segment a map. While the heavy equipment is used, the slope and/or elevation information may be used by an engine control module to adjust engine speed/RPM in response to an incline. In one embodiment, one or more drones may scout a future route/ future traffic to identify congestion. A route planning module may reroute the heavy equipment based upon the congestion. The drones may be used to determine future elevation. The engine control module may analyze the planning module to determine engine control decisions.

For example, when the engine control module identifies an aggressive slope ahead, the engine control module may increase engine torque to improve performance of the heavy equipment. When the route planning module identifies a steep decline, the engine control module may be caused to activate regenerative braking. The drones may be docked to the heavy equipment or dispatched via a waypoint along a route (e.g., at a roadside facility/installation) or a landmark (e.g., a rest area, a truck stop, etc.). The drones may facilitate the movement of multiple heavy equipment vehicles, such as assisting the entering/exiting of autonomous vehicles at a location. The drones may include self-service drones that are able to self-recharge.

In one embodiment, the present techniques facilitate risk assessment of an urban travel system. For example, the semantic segmentation information may be used to analyze the elevation and connection of roads/paths in a city. A significantly riskier road may be identified. A usage-based travel route may be identified wherein the risk associating with a particular road/path is used to plan travel. For example, a user may be notified (e.g., via a client computing device) that travel via a first road is longer, less expensive and/or less risky. The user may be notified that a second road is shorter, quicker, and/or more expensive. A route may be planned based upon a customer preference/objective (e.g., based upon the customer's preference with respect to a quickest path, a path including scenery, an eScooter route, etc.). A route may be planned based upon anticipated wear/tear on a vehicle due to changes in elevation or another aspect.

The present techniques may be used in an agricultural setting, such as in analyzing grass ways necessary for watersheds within a field. The present techniques may be used during the installation of irrigation, and/or to reduce erosion. Multi-spectral imaging may be used to determine crop health, whether fertilizers/chemicals are needed, etc. Elevation information may be used to determine whether to fill holes, to add earth, to plant an area, etc. The above-described drone technologies may be used to automate/navigate tractors, such as when plowing to pick up or lower a plow based upon the elevation of a field, or increase or decrease engine rpm based upon slope of a field and/or type of soil (e.g., rocky, dry, or swampy).

A drone may launch from a tractor and photograph a future route. Structure-from-motion may be used to uncover potential problems in the path of the tractor. The present techniques may be used to place field tiles and for crop rotation and planting decisions. The present techniques may be used to prevent chemical/manure runoff.

Facilities Operation & Management

The present techniques may be used for facilities management. For example, the present techniques may be used in golf course modeling.

A semantic segmentation 3D point cloud may allow golf course management to analyze precise terrain models. A virtual reality simulator may load a 3D point cloud to view a model/replica of the golf course for production purposes. The 3D point cloud including semantic segmentation information may be analyzed to detect erosion in a sand trap, green or fairway. For example, the 3D point cloud may be analyzed to determine how much sand is needed to replenish a sand trap, and/or to determine the acreage of a green, fairway, etc. The 3D point cloud including semantic segmentation information may be analyzed to determine irrigation and fertilizer usage, such as where irrigation heads are located in relation to one another.

The semantically segmented 3D point cloud may be used during play to determine the elevation/pitch/range of green in relation to where one is standing, and to determine play decisions/recommendations (e.g., club selection). The semantically segmented 3D point cloud enables an accurate base map with elevation information to inform assistive play applications, such as when teaching golf or when simulation a course in electronic gaming. A course may be duplicated or replicated based upon the semantic map, in some cases, using automated fabrication methods. The present techniques may be used to calculate par and to automate the delivery of products/services during play (e.g., a beverage, a snack, etc.). The semantically segmented 3D point clouds generated by the present techniques may be used in the provision of driverless/autonomous golf carts, and to prevent/reduce wear and tear on golf carts.

Aspects of play (e.g., the location of players and carts) may be added to the 3D point cloud. The 3D point cloud may be used to navigate the cart, for example by preventing driving on the green. In some embodiments, a system may use both the 3D point cloud and information from another source (e.g., a smart golf ball). A golf ball may be retrieved, e.g., from a hazard, via a drone. The semantically segmented 3D may be used to automatically identify course components (e.g., a fairway, green, rough vegetation, etc.). The present techniques may color-code the semantically segmented information within the point cloud to show course shape, curve, elevation, etc.

The present techniques may be used to implement functionality specific to other play, such as ski resorts, beaches, etc. For example, the semantically segmented 3D point cloud may be used to determine run difficulty, for hazard identification, to determine snow depth, and/or for maintenance (e.g., to identify runoff/erosion year over year). The 3D point cloud may be used to analyze locations for new ski lifts.

Modeling Peril

The present techniques may be used to model peril, such as a natural disaster. As discussed above, the present techniques enable high quality floodplain modeling.

Additionally, the present techniques may be used to implement wildfire risk management by, for example, detecting fuel loads in areas that correspond to higher likelihood of a wildfire affecting a structure/habitation. For example, the semantically segmented 3D model may be analyzed such that a fire break may be installed in a strategic location. A mapping module may automatically determine regions in the 3D point cloud where vegetation is located close to a road, a utility company property, an insured home, an insured business, etc. The "tree" label may be used to identify areas having more trees of a predetermined type (e.g., having a higher burn rate, a higher foliage density, etc.). Predictive modeling may be used to determine fire risk based upon whether trees are labeled as having leaves or needles.

It should be appreciated that the ML training/operation discussed above may be adjusted to account for any necessary spatial/semantic features, in addition to/alternate to the examples discussed. The present techniques may analyze the size/features of a structure to determine the risk level represented by the structure. The proximity of multiple structures/objects may be analyzed to determine risk.

The present techniques may be used to model risk in hurricane modeling, tornado modeling, and for modeling other convective storms. For example, the density of trees and other natural dampeners may be analyzed. Wind simulation may be performed using the semantic segmentation information contained in the 3D point cloud.

The present techniques may be used to implement earthquake modeling. For example, some soil types are more susceptible to the propagation of seismic waves. The resolution of existing soil maps is poor. In one embodiment, one or more drones collect hyperspectral imaging to determine/measure soil composition. The methods and systems may semantically segment the imaging to label soil as bedrock, clay, sand, etc. As elevation information is helpful in floodplain modeling, the soil properties may determine risk to a structure (e.g., sandy soil may undergo liquefaction in an earthquake). The height/number of stories of a building may be modeled using the present techniques, as may construction/material types (e.g., framed, masonry, etc.).

The present techniques may be used to model a potential path of lava flow for evacuation modeling. For example, the change in elevation may be analyzed to determine the cooling of lava. Topography of the 3D point cloud may be analyzed to determine lava flow, and whether a building is at risk. Mudslides, avalanches, rock slides and other disaster scenarios may be analyzed using similar techniques. Emergency response (e.g., police and fire) may be staged based upon semantically segmented information in the 3D point cloud, by identifying safe and unsafe areas.

Underwriting, Claim Handling & Retail

The present techniques may be used for underwriting, claim handling and retail purposes. In the context of underwriting, the above-described peril modeling may be used in underwriting risk assessment. A home insurance quote may be determined based upon analyzing a semantic segmentation 3D point cloud. For example, aspects of a dwelling may be counted/analyzed (e.g., a number of windows, a size of a garage, a number of stories, a roof composition, an estimated square footage, etc.). Additional characteristics may include a roof type, a chimney, a wall-mounted air-conditioning unit, etc. A drone may photograph storm damage to assess a damaged home, and to automatically handle a claim using detailed existing data and real-time data from a 3D point cloud. The present techniques may be implemented in the provision of crop insurance.

The present techniques may augment the 3D point cloud with historical customer data. When the model is missing information (e.g., has gaps) a GAN may combine 3D point cloud information with historical descriptions to fill the gaps. For example, when a structure is described in a textual description as having gray vinyl siding, the GAN may probabilistically fill the gaps using an imputed gray vinyl pattern.

The semantically segmented information may be used in fraud detection and for accident reconstruction. For example, a drone may capture imagery corresponding to a post-accident scene, and the scene may be semantically segmented. Certain information (e.g., broken glass, skid marks) may be used to detect the presence of an accident and/or as physical evidence (e.g., to determine speed).

The present techniques may facilitate access by retail customers. For example, an insurer may allow a user to purchase semantically segmented 3D point cloud data by encircling an area on a map. The insurer may provide the customer with the option to purchase one or more semantic 3D point cloud corresponding to the encircled area (e.g., a map of buildings, a map of vegetation, a map of the ground, etc.). The customer may submit one or more labels and a filtered 3D point cloud may be automatically generated and transmitted to the customer via a backend server.

In some embodiments, the user may select different layers/models such as 3D models, orthomosaic models, etc. In one embodiment, the customer provides a 3D point cloud not including semantic segmentation information, and the insurer analyzes the customer's 3D point cloud using, e.g., the server 108 to generate a semantically segmented 3D point cloud. The semantically segmented point cloud may be delivered to the customer.

In some embodiments, an end user (e.g., a homeowner) flies a drone over the end user's property, and uploads images to the insurer, which provides the customer with a semantically segmented 3D point cloud, including an exterior inventory of home or other information. The insurer may provide a specific flight pattern for collecting optimal photos. With the end user's permission, the insurer may pass the segmented 3D point cloud to an underwriting and/or claims department. The claims/underwriting department may analyze the 3D point cloud in conjunction with existing data for different purposes (e.g., to detect structural changes). The present techniques may be used during the insurance application process. For example, a module operated by the insurer in the client device (e.g., an application executing in a consumer smart phone) may execute a drone flight path wherein the drone takes photographs of the applicant's home.

The present techniques may be used to generate physical 3D models that may include semantic segmentation information (e.g., surfaces of a different type may be printed using different colors of material using a 3D printer).

Smart phone applications may include the semantically segmented 3D point cloud information, and such information may be provided to developers via an API. Haptic feedback and/or voice feedback may be used to provide mapping capabilities. The height and/or slope of a workout may be analyzed, and custom workouts may be generated using the 3D point cloud information. In some embodiments, the semantically segmented 3D point clouds may be used to develop video games.

Construction & Urban Planning

The present techniques may be used in construction volumetrics. For example, in a major construction effort, the site must be cleared before building may begin, often at significant cost. Conventionally, estimates for cost are based upon crude measurements of land. The present techniques advantageously improve existing volumetrics measurement approaches by providing more precise ground elevation information. The elevation information may be used to calculate volumes of soil more accurately and to determine more refined cost estimates. The present techniques may be used in mining. The 3D map may be used to measure/analyze a building that is under construction.

The present techniques may be used during construction of an area (e.g., before building a residential subdivision). The segmented 3D point cloud may be used to survey land to determine locations for sewer management pumps, which may work more efficiently at particular relative elevations. The present techniques may be used to avoid building on saturated ground, for example, when installing concrete or asphalt. The present techniques may be used in utility management (e.g., for sewer, gas, power, and water). The present techniques may be used to model the location of street signs.

As noted above, the present techniques may be used to generate semantically segmented 3D point clouds that are very accurate. Such point clouds may be used to determine the attributes of buildings (e.g., blueprints, elevation of windows, how far windows are away from each other, the shadow of buildings, landscaping, architectural features, etc.). Such point clouds have many uses, including for historic preservation/modeling/reconstruction of historic or otherwise significant sites. Such 3D models may be combined with a customer's written description to rebuild a damaged home, filling in any gaps in the 3D point cloud with the customer's recollections.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, the term "set" may include a collection of one or more elements.

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer system comprising:
   one or more processors; and
   a memory storing instructions that, when executed by the one or more processors, cause the computer system to:
      receive, via one or more processors, at least one two-dimensional image corresponding to an outdoor scene, the outdoor scene including one or more outdoor objects; and
      analyze, via one or more processors, the at least one two-dimensional image using a trained deep artificial neural network to generate a respective set of one or more labeled points, each of the one or more labeled points corresponding to a respective class label describing at least one of outdoor objects depicted in the two-dimensional image, wherein the respective class label indicates a type of outdoor object corresponding to the labeled point.

2. The computer system of claim 1, wherein the two-dimensional image corresponding to the outdoor scene is captured via a drone capture device.

3. The computer system of claim 1, the memory storing further instructions that, when executed by the one or more processors, cause the system to
   train the deep artificial neural network using a plurality of manually labeled training images.

4. The computer system of claim 1, the memory storing further instructions that, when executed by the one or more processors, cause the system to
   solve a system of equations.

5. The computer system of claim 1, the memory storing further instructions that, when executed by the one or more processors, cause the system to
   store the trained deep artificial neural network in an electronic storage device.

6. The computer system of claim 1, the memory storing further instructions that, when executed by the one or more processors, cause the system to
   insert the set of labeled points into a three-dimensional point cloud according to a plurality voting algorithm.

7. The computer system of claim 1, wherein each respective set of one or more labeled points are stored in a matrix.

8. A computer-implemented method comprising:
   receiving at least one two-dimensional image corresponding to an outdoor scene, the outdoor scene including one or more outdoor objects; and
   analyzing the at least one two-dimensional image using a trained deep artificial neural network to generate a respective set of one or more labeled points, each of the one or more labeled points corresponding to a respective class label describing at least one of outdoor objects depicted in the two-dimensional image, wherein the respective class label indicates a type of outdoor object corresponding to the labeled point.

9. The computer-implemented method of claim 8, wherein the two-dimensional image corresponding to the outdoor scene is captured via a drone capture device.

10. The computer-implemented method of claim 8, further comprising:
    training the deep artificial neural network using a plurality of manually labeled training images.

11. The computer-implemented method of claim 8, further comprising:
    storing the trained deep artificial neural network in an electronic storage device.

12. The computer-implemented method of claim 8, further comprising:
    processing the set of labeled points to identify one or more tie points.

13. The computer-implemented method of claim 8, further comprising:
    inserting the set of labeled points into a three-dimensional point cloud according to a plurality voting algorithm.

14. The computer-implemented method of claim 8, wherein each respective set of one or more labeled points are stored in a matrix.

15. A non-transitory computer readable storage medium storing executable instructions that, when executed by a processor, cause a computer to:
    receive at least one two-dimensional image corresponding to an outdoor scene, the outdoor scene including one or more outdoor objects; and
    analyze the at least one two-dimensional image using a trained deep artificial neural network to generate a respective set of one or more labeled points, each of the one or more labeled points corresponding to a respective class label describing at least one of outdoor objects depicted in the two-dimensional image, wherein the respective class label indicates a type of outdoor object corresponding to the labeled point.

16. The non-transitory computer readable storage medium of claim 15, storing further executable instructions that, when executed by a processor, cause a computer to:
    train the deep artificial neural network using a plurality of manually labeled training images.

17. The non-transitory computer readable storage medium of claim 15, storing further executable instructions that, when executed by a processor, cause a computer to:
    solve a system of equations.

18. The non-transitory computer readable storage medium of claim 15, storing further executable instructions that, when executed by a processor, cause a computer to:
    store the trained deep artificial neural network in an electronic storage device.

19. The non-transitory computer readable storage medium of claim 15, storing further executable instructions that, when executed by a processor, cause a computer to:
    insert the set of labeled points into a three-dimensional point cloud according to a plurality voting algorithm.

20. The non-transitory computer readable storage medium of claim 19, storing further executable instructions that, when executed by a processor, cause a computer to:
    transmit the three-dimensional point cloud to a user device.

* * * * *